United States Patent [19]
Allenberg

[11] Patent Number: 5,132,897
[45] Date of Patent: Jul. 21, 1992

[54] METHOD AND APPARATUS FOR IMPROVING THE ACCURACY OF CLOSED LOOP CONTROLLED SYSTEMS

[75] Inventor: Bernd Allenberg, Karlsruhe, Fed. Rep. of Germany

[73] Assignee: Carl Schenck AG, Darmstadt, Fed. Rep. of Germany

[21] Appl. No.: 594,822

[22] Filed: Oct. 9, 1990

[30] Foreign Application Priority Data

Oct. 6, 1989 [DE] Fed. Rep. of Germany ....... 3933471

[51] Int. Cl.$^5$ ...................... G05B 17/02; G01G 13/00
[52] U.S. Cl. ..................... 364/149; 177/59; 222/56; 364/165; 364/554; 364/567
[58] Field of Search .................. 364/149–151, 364/157–159, 164, 165, 567, 465, 466, 478, 568, 554, 183; 177/59, 60, 63, 64, 66, 71, 114, 119, 121, 122, 123; 222/1, 56, 58, 59

[56] References Cited

U.S. PATENT DOCUMENTS

| | | | |
|---|---|---|---|
| 3,767,900 | 10/1973 | Chao et al. | 364/151 |
| 3,876,871 | 4/1975 | Sinner | 364/151 |
| 4,762,252 | 8/1988 | Hyer et al. | 222/56 |
| 4,775,949 | 10/1988 | Kalata | 364/567 |
| 4,893,262 | 1/1990 | Kalata | 364/567 |

FOREIGN PATENT DOCUMENTS

| | | |
|---|---|---|
| 2754527 | 6/1978 | Fed. Rep. of Germany . |
| 3721186 | 1/1988 | Fed. Rep. of Germany . |
| 3926038 | 6/1990 | Fed. Rep. of Germany . |
| 1-92801 | 4/1989 | Japan . |

OTHER PUBLICATIONS

"Regelungstechnik und Prozess-Datenverarbeitung", (Zur Adaptierung von Eingroessen-Regelkreisen mit harmonischen Pruefsignalen*), by von A. H. Glattfelder, Zurich, 18 Jan. 1970; pp. 485–532.

"Static State Estimation in Power Systems Comparison of the Line Flow Estimator and the Extended Kalman Filter"; Ammerman et al., Proceedings of the Nineteenth Annual North American Power Symposium, NAPS'86, Oct. 22–23, 1987.

*Primary Examiner*—Joseph Ruggiero
*Attorney, Agent, or Firm*—W. G. Fasse

[57] ABSTRACT

The precision of a closed loop control system, for example of a loss-in-weight feeder, having a controlled operating section and a closed loop controlling section, is improved by adjusting the closed loop controlling section with regard to at least two stochastic precision disturbing signals. One such signal may represent disturbances that affect a sensor for ascertaining the actual weight of the scale. The other value may represent estimated bulk material density variations or disturbances. A model generator (7) provides spectra representing these disturbing values. A noise parameter estimator (17) selects those spectra most closely resembling the spectra of the disturbing values for producing an adjusting signal that is used to adapt the closed loop controlling section (5) to an optimal control. The closed loop controlling section (5) has connected thereto an evaluating circuit (14) including the model generator (7) for performing the correction or adjustment.

8 Claims, 6 Drawing Sheets

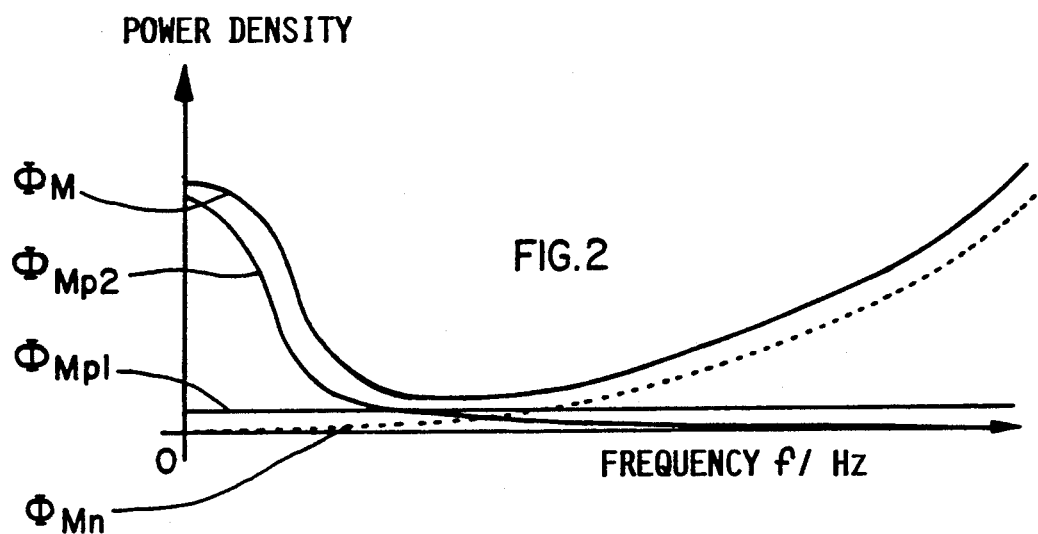
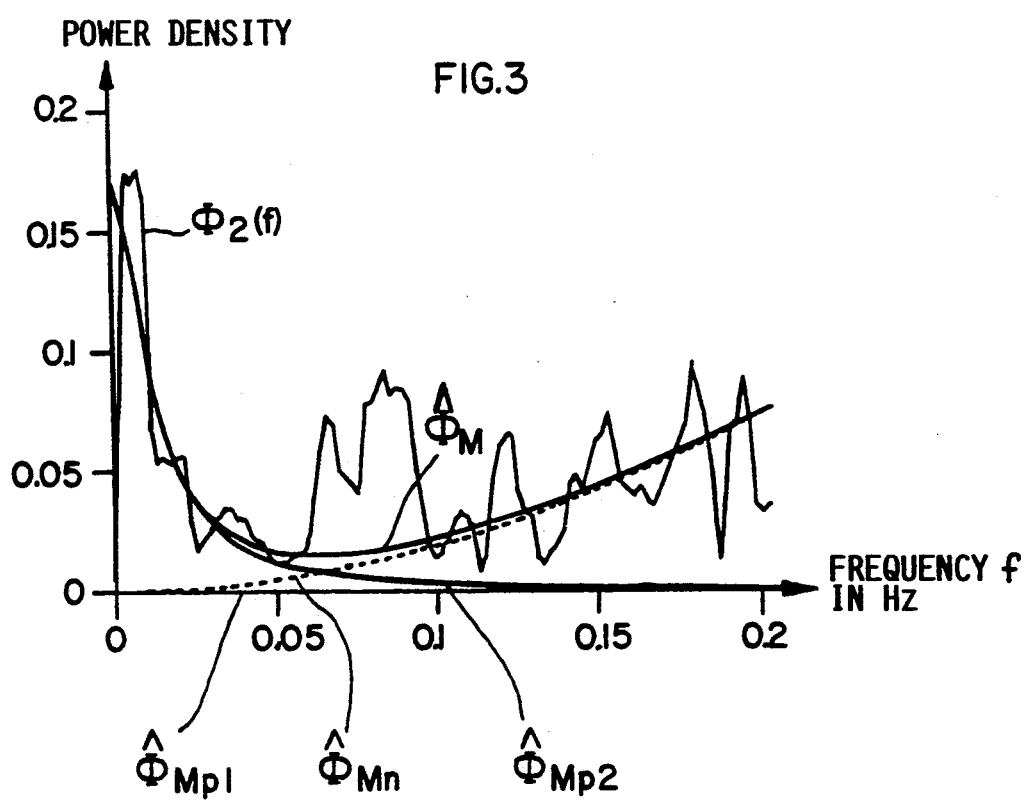

FIG. 8

```
┌─────────────────────────────────────────────────────────────┐
│                 Assumed physical model:                      │
│                                                              │
│      φ_{Mρ1} = φ_{ρ1}              φ_{Mn} = f² φ_n           │
│                   φ_{ρ2}                                     │
│      φ_{Mρ2} = ─────────           φ_M = φ_{Mρ1} + φ_{Mρ2} + φ_{Mn}
│               1 + (T_ρ f)²                                   │
└─────────────────────────────────────────────────────────────┘
```
— 7.1

$$\phi_{M\rho 1} = \phi_{\rho 1} \qquad \phi_{Mn} = f^2 \phi_n$$

$$\phi_{M\rho 2} = \frac{\phi_{\rho 2}}{1 + (T_\rho f)^2} \qquad \phi_M = \phi_{M\rho 1} + \phi_{M\rho 2} + \phi_{Mn}$$

Model for small deviations:

$$\Delta\phi_{M\rho 2} = \frac{1}{1 + (T_{\rho 0} f)^2} \Delta\phi_{\rho 2} - \frac{2\phi_{\rho 20} f^2 T_{\rho 0}}{(1 + (T_{\rho 0} f)^2)^2} \Delta T_\rho$$

$$= D(f) \Delta\phi_{\rho 2} + E(f) \Delta T_\rho$$

— 7.2

Linear Model around $T_{\rho 0}$ and $\phi_{\rho 20}$:

$$\phi_{ML} = \begin{bmatrix} 1 \\ 1 \\ . \\ 1 \end{bmatrix} \phi_{\rho 1} + \begin{bmatrix} (f_0)^2 \\ (2f_0)^2 \\ . \\ (Nf_0)^2 \end{bmatrix} \phi_n$$

$$+ \begin{bmatrix} D(f_0) \\ D(2f_0) \\ . \\ D(Nf_0) \end{bmatrix} \Delta\phi_{\rho 2} + \begin{bmatrix} E(f_0) \\ E(2f_0) \\ . \\ E(Nf_0) \end{bmatrix} \Delta T_\rho + \begin{bmatrix} \phi_{M\rho 2}(f_0, T_{\rho 0}, \phi_{\rho 20}) \\ \phi_{M\rho 2}(2f_0, T_{\rho 0}, \phi_{\rho 20}) \\ . \\ \phi_{M\rho 2}(Nf_0, T_{\rho 0}, \phi_{\rho 20}) \end{bmatrix}$$

$$= \begin{bmatrix} 1 & D(f_0) & E(f_0) & (f_0)^2 \\ 1 & D(2f_0) & E(2f_0) & (2f_0)^2 \\ . & . & . & . \\ 1 & D(Nf_0) & E(Nf_0) & (Nf_0)^2 \end{bmatrix} \cdot \begin{bmatrix} \phi_{\rho 1} \\ \Delta\phi_{\rho 2} \\ \Delta T_\rho \\ \phi_n \end{bmatrix} + \phi_{M\rho 20}$$

$$= M \cdot P + \phi_{M\rho 20}$$

— 7.3

$\phi_{ML} \downarrow M$

METHOD AND APPARATUS FOR IMPROVING THE ACCURACY OF CLOSED LOOP CONTROLLED SYSTEMS

FIELD OF THE INVENTION

The invention relates to a method and apparatus for improving the control precision of closed loop controlled systems. More specifically, the invention relates to closed loop controlled systems which include a so-called "loss-in-weight feeder" for bulk materials. In such systems, the loss-in-weight feeder with its drive constitutes a controlled operating section of the system while a closed loop controller circuit constitutes a controlling section of the system. Herein the "loss-in-weight feeder" is simply referred to as "feeder".

BACKGROUND INFORMATION

The throughput of a closed loop controlled feeder is computed from the weight of the conveying system, including the hopper containing the material to be fed, which varies with time. As the hopper empties there is a "loss-in-weight". For this purpose the weight of the system is sampled at well defined instances and the sampled signal is differentiated to produce a throughput signal which is proportional to the throughput. The throughput may vary with time because the bulk material density may vary with time. The just mentioned throughput signal contains signal components which are caused by disturbances of the signal sensor or sampler. Such sensor disturbances or faults called observation noise in this disclosure, can be caused by several different sources, for example, by accelerations at the location of the weighing system, by electrical noise, or by so-called quantization noise. On the other hand, bulk material density variations constitute disturbances which, for example, can be caused by such factors as lumpy bulk materials or by a non-uniform supply of the bulk material to the feeder. Such disturbances cannot be predicted in time. Therefore, these disturbances are generally referred to as stochastic noise. Further, the above mentioned observation noise cannot be separated from the wanted signal of the weighing system, and therefore, these disturbances also falsify the feeding result.

German Patent Publication (DE-OS) 3,721,186, based on U.S. Ser. No. 879,430, filed on Jun. 27, 1986 now U.S. Pat. No. 4,775,949, discloses a closed loop controlled feeder in which observation noise and bulk material density variations are taken into account by way of a model calculation, whereby the size of these disturbances and variations are taken into account when an estimated value is formed. In the known system a Kalman filter process is used to estimate the actual weight and the throughput or feed rate of the material. The estimated throughput signal is produced based on a model of the known feeding and weighing system, on the measured weight, and based on stochastic models for the noise phenomena that influence the system. The models for the different types of noise are modified in accordance with the size of their influence on the system and in accordance with the probability of their occurrence. In the known method the observation noises are taken into account in that prior to placing the particular feeding system in service, the variance $\rho^2_n$ serving for the calculation of the model must be ascertained either experimentally or empirically. Such a system or method has the disadvantage that the mathematical model can be calculated only with the aid of the characteristic values of the particular system that have been ascertained experimentally or empirically prior to putting the system into actual use. The characteristic values so obtained have no application of a general nature and in general cannot be used for other systems.

OBJECTS OF THE INVENTION

In view of the foregoing it is the aim of the invention to achieve the following objects singly or in combination:

to provide a method and apparatus for the improvement of the precision of closed loop control systems, especially of a differential dosing scale system in which the characteristic values of stochastic disturbances of any particular sensor system can be determined automatically during closed loop operation;

to avoid ascertaining the disturbance characteristic values again when components of the weighing system have been exchanged or repaired;

to make sure that the timing intervals at which a closed loop control takes place are independent of the timing intervals at which the closed loop control is adjusted and vice versa, so that both time intervals can be selected in accordance with the respective requirements in an optimal manner; and to minimize the computer investment for achieving the correction or adjustment of the closed loop control.

SUMMARY OF THE INVENTION

The adjustment or adaptation of the closed loop control of the invention is achieved by the following steps.

First, the sensor output signal is sampled. A difference of two neighboring samples from the time series of the estimated mass-flow values is formed. This series is scanned over a fixed length of time, for example, 100 seconds forming a set of data. Second, the power density spectrum is formed from the set of estimated mass-flow values. Third, a spectrum of stochastic disturbances is determined from the spectrum of the mass flow values by disregarding proportions of monochromatic disturbances in the mass flow spectrum. Fourth, the stochastic disturbance spectrum is compared with at least two mathematical model spectra representing stochastic disturbances such as observation noise and variations of the bulk material density, whereby that model spectrum is selected that most closely represents the stochastic disturbance spectrum. Sixth, the selected model spectrum is divided into first portions corresponding to observation noise and into second parts corresponding to variations in the bulk material density. Seventh, the first and second portions of the selected model spectrum are then used to adapt the controlling section in order to increase the accuracy of the closed loop controlled system and the variation of the throughput.

The apparatus according to the invention for performing the present method comprises a closed loop control system including a controlled operating section, including means, such as a feeder with a scale, a hopper filled with bulk material, and a feeder drive. The apparatus further includes a closed loop controlling section and signal evaluating circuit means for minimizing at least two stochastic precision disturbing values in their influence on the closed loop control. The closed loop controlling section includes a mass-flow estimator circuit (12), a memory (5c), a summing circuit (5b) and a system controller (5). The circuit means for minimizing perform a mathematical model calculation and comprise a spectral analyzer circuit (15) for scanning for a fixed length of time, the estimated signal representing the actual feed rate estimated from the feeder or scale output for said fixed length of time in the controlled operating section and for calculating a first power density spectrum. The circuit further includes a spectrum identifier circuit (6) operatively connected to the output of the spectral analyzer circuit for identifying frequencies of the output density spectrum which exceed a fixed threshold. The circuit further includes a correction circuit (16) connected to the output of the spectral analyzer circuit (15) and to the output of the spectrum identifier circuit (6) for forming a second output density spectrum including stochastic disturbances only. The circuit further includes a noise parameter estimator circuit (17) connected to the output of the correction circuit (16) and a model generator (7) which itself is connected to the output of the noise parameter estimator circuit (17) for providing the model spectra to the noise parameter estimator circuit (17) to enable the latter to select the proper approximation model spectrum which most closely approximates the second power density spectrum of stochastic disturbances. The circuit further includes a closed loop controller adjustment circuit (18) having one input connected to the output of the noise parameter estimator (17) and a further input connected to the output of the model generator (7) for selecting from the approximation model spectrum a spectrum representing one of said two stochastic precision disturbing signals and for selecting from model spectra supplied by the model generator (7) the other of said two stochastic precision disturbing signals. The closed loop controller adjustment circuit (18) is connected at (8) to a controller means (5) for adjusting the structure and parameters of the controller (5) to provide an optimal control at defined time instances.

The invention has the advantage that certain characteristic values of the stochastic disturbances that may be caused by observation noise of a feeder or scale can be derived basically from the actually measured values. Thus, it is no longer necessary to ascertain these characteristic values again or anew when components of the sensor system have been replaced or repaired. Further, it is no longer necessary to check the respective characteristic values of the apparatus or system at certain time intervals. As a result, it is no longer necessary to shut down the control circuit for the pick-up of the characteristic values.

Additionally, the invention has the advantage that the adjustment or correction rate does not need to be coupled to the sampling rate of the closed loop controller (5). As a result, the present method and apparatus are easily adaptable to the individual requirements of any particular dosing system. Thus, it is, for example, possible to increase for particular dosing systems which operate substantially under constant environmental conditions, the duration between control adjustments while keeping the closed loop control rate as small as required.

Another advantage of the invention is seen in that the monochromatic disturbances are quickly and easily separated from stochastic disturbances so that a substantial improvement in the dosing accuracy is achieved.

Another advantage of the invention is seen in that the relatively longer timing intervals for the adjustment of the closed loop controller compared to the short sampling rate for the closed loop control operation permits keeping the computer effort and expense for identifying the disturbing components in the controlled mass-flow relatively small.

BRIEF DESCRIPTION OF THE DRAWINGS

In order that the invention may be clearly understood, it will now be described, by way of example, with reference to the accompanying drawings, wherein:

FIG. 2 shows characteristic curves of the power densities of the disturbing signals;

FIG. 3 illustrates a certain spectrum of stochastic disturbances and the model spectra determined from the certain spectrum of stochastic disturbances;

FIG. 8 describes in mathematical terms the models generated by the model generator of FIG. 1;

DETAILED DESCRIPTION OF PREFERRED EXAMPLE EMBODIMENTS AND OF THE BEST MODE OF THE INVENTION

The following detailed description uses a plurality of mathematical symbols. These symbols are set forth and defined in the "Table of mathematical Symbols" at the end of this specification.

Figure 1:
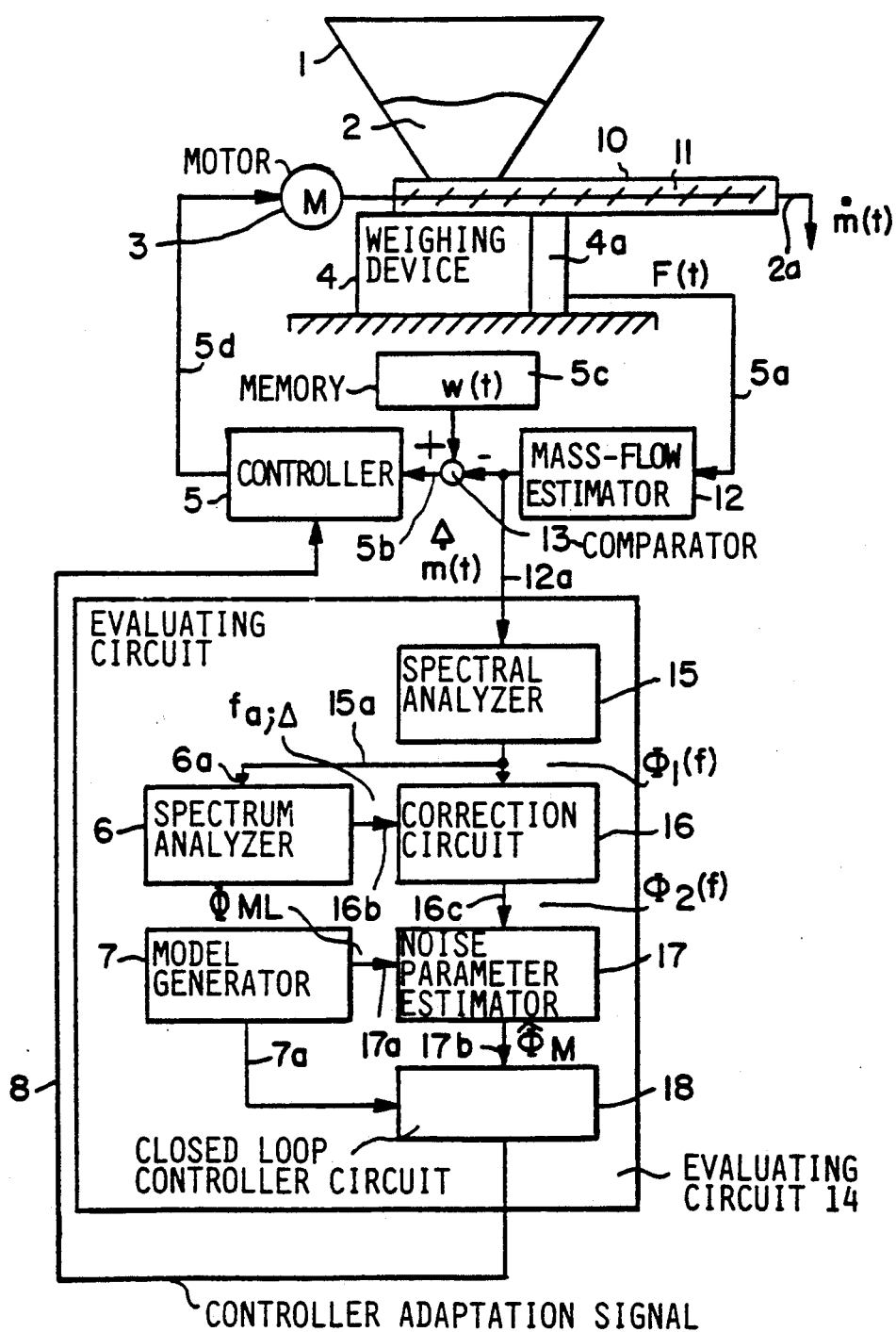
FIG. 1 is a block diagram of the present circuit arrangement for improving the control precision of a closed loop controlled system, including a feeder.

The block circuit diagram of FIG. 1 shows in its top portion a closed loop control system comprising a closed loop controlled operating section and a closed loop controlling section. The controlled operating section includes a volumetric dosing system 10 and the closed loop controlling section includes a controller circuit 5. The dosing system 10 comprises a weighing scale 4, a supply bin or hopper 1 holding flowable bulk material 2 to be supplied to a bulk material output 2a by a conveying device such as a screw feeder 11 driven by a motor 3. The r.p.m. of the motor 3 and the density of the bulk material determine the output mass-flow rate $\dot{m}(t)$. The weighing scale 4 includes a weighing cell 4a which is a sensor providing a weight signal $F(t)$. The just described components form the controlled operating section of the system.

The system also includes a closed loop controlling section including a conductor 5a connecting the output of the weighing cell 4a to an input of a mass-flow estimator circuit 12 provided according to the invention and to be described in more detail below. The controlling section further includes a summing or comparator circuit 13 connected with one of its inputs to the mass-flow estimator circuit 12 and with another of its inputs to a memory circuit 5c to receive a set point signal $W(t)$.

Figure 4:
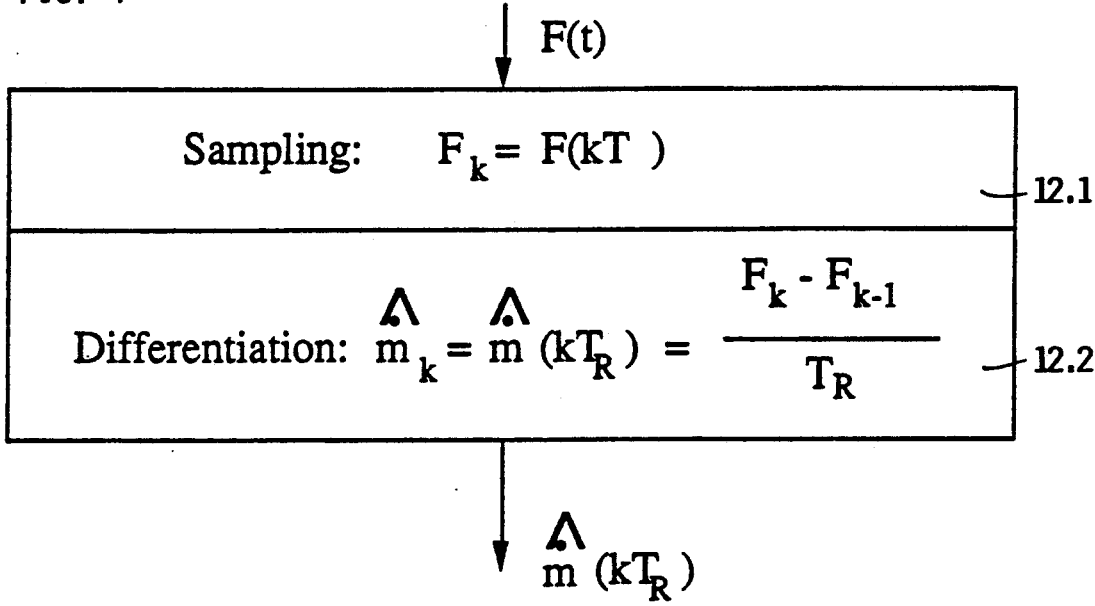
FIG. 4 shows a block diagram of the mathematical functions performed in the mass-flow estimator circuit (12) shown in FIG. 1.

The output 5b of the summing or comparator circuit 13 is connected to an input of a controller circuit 5 for the closed loop controlled circuit. The output of the controller 5 is connected through a conductor 5d for supplying a control signal to the motor 3. The mass-flow estimator circuit 12, the function of which is shown in FIG. 4, has its output further connected through a conductor 12a to an input of a signal evaluating circuit 14 according to the invention. The mass-flow estimator circuit section 12.1 samples the weight signal F(t) at determined time instances $k \cdot T_R$ and forms by differentiation at 12.2 an estimated value $\hat{m}$ ($kT_R$). This estimated value corresponds to the mass-flow achieved by the screw feeder 11. The differentiating circuit of the estimator 12 forms an actual value that is compared in the operator 5b with the set point W(t). The set point is the desired mass-flow output. The controller circuit 5 forms from the output of the comparator circuit 5b a motor control which is supplied to the drive motor 3 for controlling the latter in accordance with the control deviation. Thus, the elements 5a, 12, 5b, 5c, 5, and 5d form the controlling section of the system.

Figure 6:
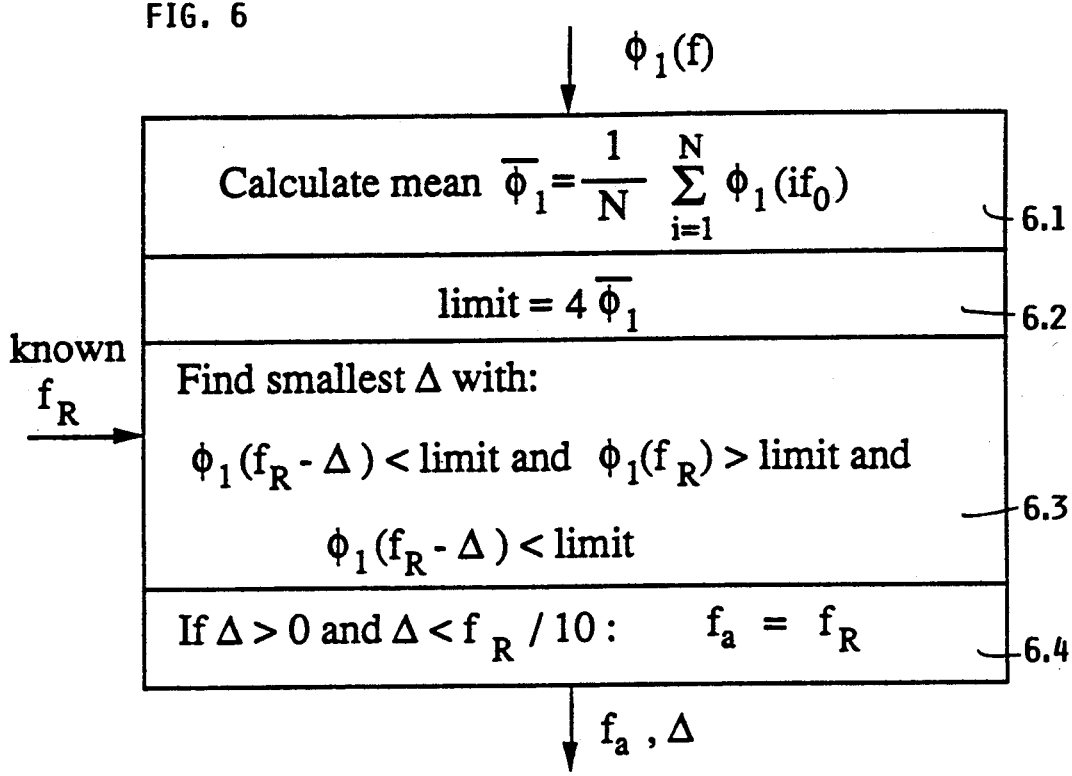
FIG. 6 shows in block form the mathematical functions performed by the spectrum identifier circuit (6) of FIG. 1.

The estimated actual value of the mass-flow formed by the mass-flow estimator circuit 12 includes disturbing signal components which are, for example, caused by the time fluctuations in the bulk material density of the volume flow through the output 2a. Further, depending on the type of scale 4 to measure the mass or weight forces enter into the weight signal which can be caused by accelerations at the location where the weighing system is installed. Disturbances also arise in the sensor system, causing inaccurate measurements. All of these disturbances may be referred to as sensor disturbances that act on the sensor system. In order to minimize the effects of such sensor disturbances on the closed loop control of the system, the invention provides the above mentioned evaluating circuit 14, the input of which is connected through a conductor 12a to the output of the estimator circuit 12. The evaluating circuit 14 ascertains the proportion of the just mentioned disturbances and produces from these proportions an adaptation signal that is supplied through conductor 8 to an adjustment input of the controller circuit 5 as will be described in more detail below. The correction signal adapts the transfer function of the controller circuit 5 in accordance with the respective disturbance components in the output signal from the estimator 12. To achieve this adaptation the spectrum identifier calculates the mean $\bar{\phi}_1$ of the spectrum $\phi_1(f)$ in step 6.1 and the limit $4\bar{\phi}_1$ in 6.2. For the known frequencies $f_R$ it is checked in 6.3 whether in a range of $2\Delta$ the spectrum exceeds the limit. If the limit is exceeded, circuit 6.4 assumes a said monochromatic noise and provides the center frequency $f_a = f_R$ and the range $\Delta$ to the input 16b of the correction circuit, please see FIG. 6.

The evaluating circuit 14 comprises at its input a spectral analyzing circuit 15 which scans or samples the output of the mass-flow estimator circuit 12 for a certain scanning time interval of, for example, about 100 seconds to form the data set $<\hat{m}_k>$. For achieving a sufficient accuracy, the scanning interval $N \cdot T_R$ used by the analyzing circuit 15 is selected in any event to be larger than the closed loop control cycle $T_R$ of the controller circuit 5.

Figure 5:
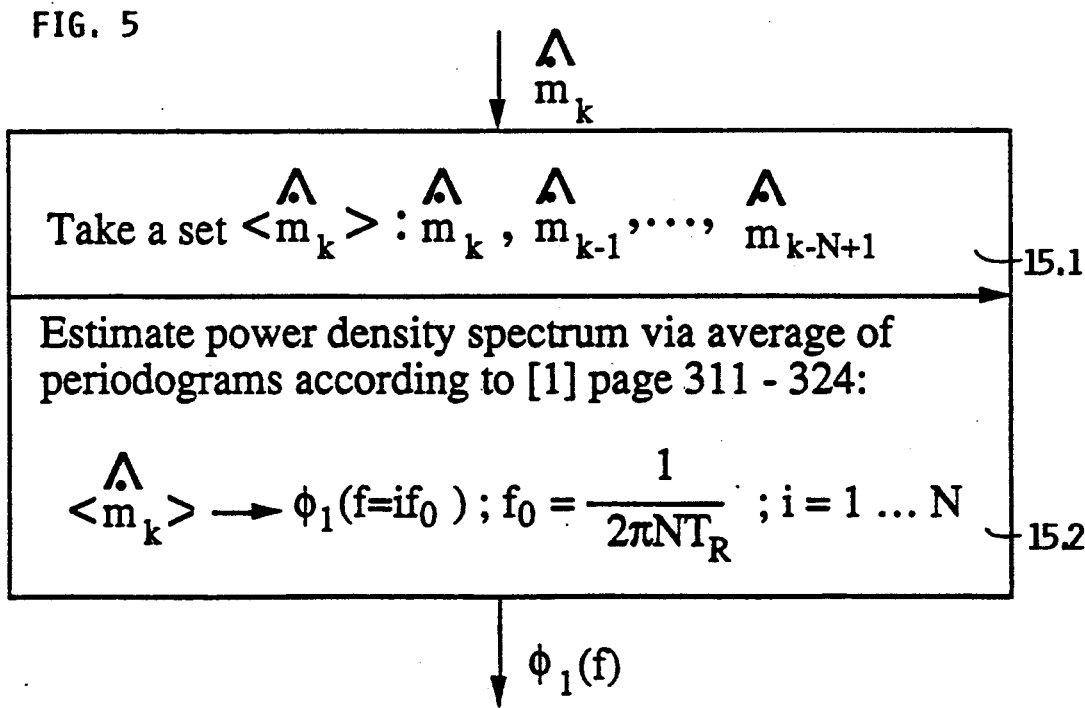
FIG. 5 illustrates in block form the mathematical functions performed by the spectral analyzing circuit (15) of FIG. 1.

Referring to FIG. 5, the spectral analyzer circuit 15 has two sections 15.1 and 15.2 for performing a discrete Fourier transform of the estimated signal $\hat{m}$ to estimate a power density spectrum $\phi_1(f)$ as a function of frequency f. The estimation is performed by conventional steps as disclosed by Steven A. Tretter in "Introduction to Discrete-Time Signal Processing", pages 320 to 324, published by John Wiley and Sons, 1976. The content of these pages is hereby incorporated by reference into the present disclosure. The just mentioned power density spectrum $\phi_1$ is supplied to one input 16a of a correction circuit 16 and also to one input 6a of a spectrum identifier circuit 6. Another input 16b of the correction circuit 16 is connected to an output of the spectrum identifier circuit 6 providing a signal representing a frequency center $f_a$. The spectrum of the throughput $\phi_1(f)$ comprises for practical dosing scale systems, especially those that include rotating components, strong power density portions within narrow frequency ranges. These narrow frequency ranges having a strong power density are based on monochromatic disturbances having a spectrum that must be separated from the spectrum of the stochastic disturbances. Since the frequency $f_R$ of the monochromatic disturbances is generally known, the spectrum $\phi_1$ is supplied through the conductor 15a to the input 6a of the spectrum identifier 6. The spectrum identifier 6 determines the frequency ranges where the spectrum exceeds a certain limit and thus constitute the monochromatic disturbances. The center $f_a$ of these frequency ranges having a high power density, is supplied to an input 16b of the correction circuit 16 which attenuates the power density in these frequency ranges so that the attenuated values $\phi_2(f)$ correspond to the value of the power density of the stochastic disturbances only.

As shown in the detailed description of the correction circuit 16 for frequencies outside the interval $f_a - \Delta$ and $f_a + \Delta$ the spectrum $\phi_2(f)$ is equal to $\phi_1(f)$ and inside said interval it is the linear interpolation between $\phi_1(f=f_a-\Delta)$ and $\phi_1(f=f_a+\Delta)$.

Such a correction circuit 16 can, in an alternative embodiment, be so constructed that only the spectrum between the frequency ranges having high power density is used for evaluating the model of stochastic disturbances.

Figure 9:
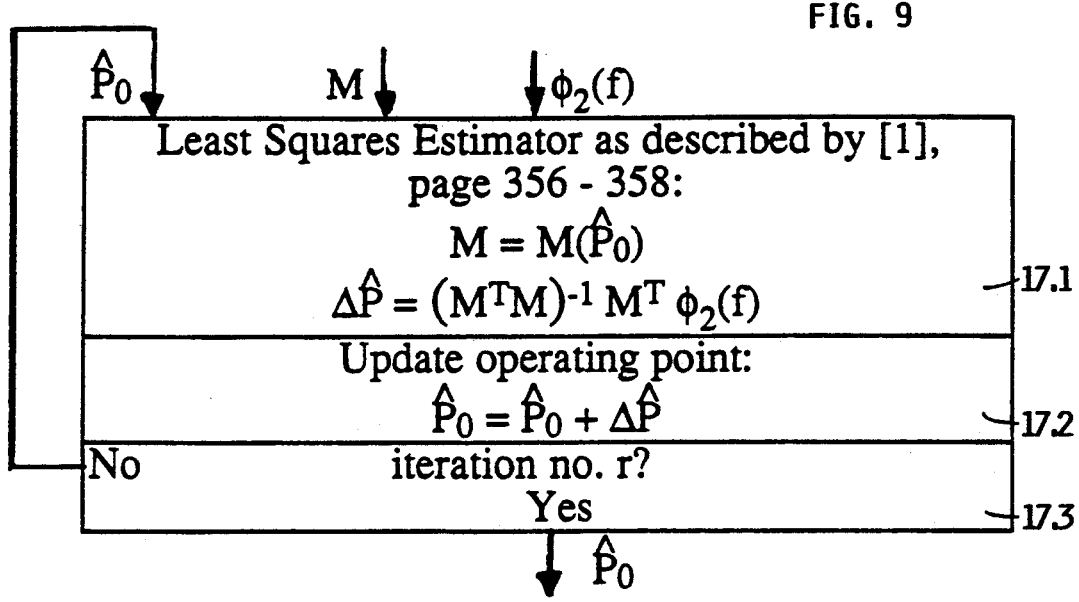
FIG. 9 describes in mathematical terms the functions performed by the noise parameter estimator circuit of FIG. 1.

The output of the correction circuit 16 provides a power density spectrum $\phi_2(f)$ which contains only the proportions of the spectrum of the stochastic disturbances $\phi_2$. This spectrum is supplied through a conductor 16c to one input of a noise parameter estimator 17, the operation of which is shown in FIG. 9. The other input 17a of the noise parameter estimator 17 receives model spectra $\phi_M$ from a model spectrum generator 7 for comparison. The spectrum generator 7 includes the knowledge of the physical power density spectrum structures $\phi_{Mp1}$, $\phi_{Mp2}$, $\phi_{Mn}$ and the sum $$\phi_M = \phi_{Mp1} + \phi_{Mp2} + \phi_M$$

of the disturbances in 7.1. These mathematical models depend on the noise parameters $\phi_{p1}$, $\phi_{p2}$, $\phi_n$ and $T_p$ as well as on the frequency f. The nonlinear influence of the parameters $\phi_2$ and $T_p$ is linearized in step 7.2 to form a model $\Delta\phi_{Mp2}$ for small deviations $$\Delta\phi_{p2} = \phi_{p2} - \phi_{p20}$$

and $$\Delta T_p = T_p - T_{p0}$$

around the point $\phi_{p20}$ and $T_{p0}$. The linear model spectrum $\phi_{ML}$ is calculated in 7.3 by evaluating $\phi_{Mp1}$, $\phi_{Mp2}$ and $\phi_{Mn}$ at the frequencies $f=i\ f_0$ with $i=1...N$. The output model $\phi_{ML}$ also contains the mathematical dependencies of the spectrum on the parameter meter vector $$P=(\phi_{p1}, \Delta\phi_{p2}, \phi_n, \Delta T_p)^T$$

containing the parameters mentioned above and the model matrix M. $(.)^T$ means the transpose of a vector or matrix. These model spectra are calculated by the model generator 7 with the aid of the following equation:

$$\phi_M = f^2\ \phi_{Mn} + \phi_{Mp1} + \frac{\phi_{Mp2}}{1 + (T_p \cdot f)^2}$$

Figure 7:
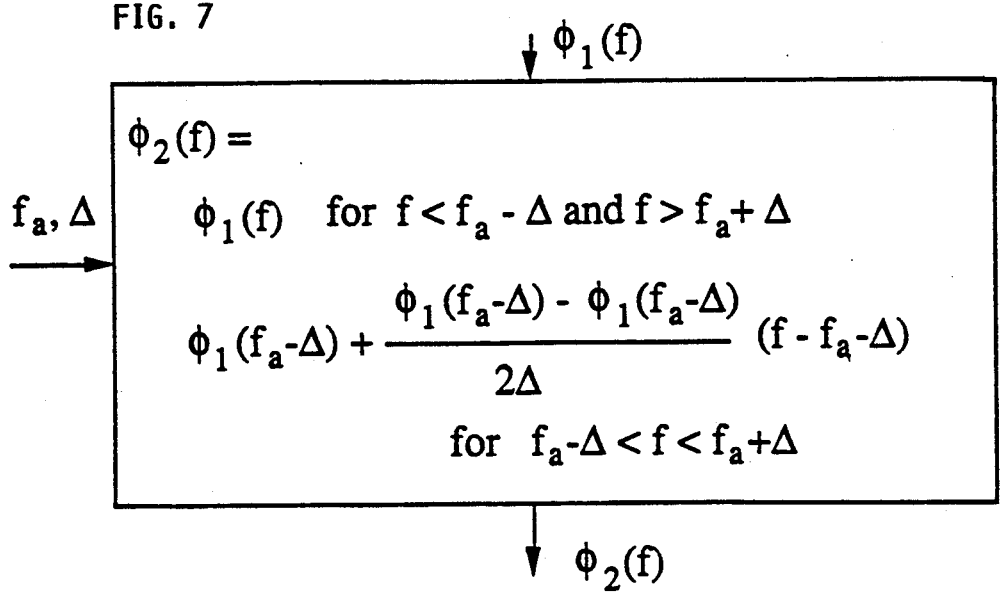
FIG. 7 illustrates the mathematical functions performed by the correction circuit (16) of FIG. 1.

The operation of the model generator 7 is shown in FIG. 7.

A model spectrum according to 7.1 of the physical stochastic disturbances of the sensor system and of the bulk material density fluctuations, is shown in FIG. 2. FIG. 2 shows that the power density spectrum $\phi_{Mn}$ corresponding to the observation noise, rises proportional to the square of the frequency f plotted on the abscissa. Power density is plotted on the ordinate. FIG. 2 further shows characteristic curves $\phi_{Mp1}$ and $\phi_{Mp2}$ representing different portions of the bulk material density fluctuations. These different portions include a constant, frequency independent portion $\phi_{Mp1}$ and a frequency dependent portion $\phi_{Mp2}$. The frequency dependent portion d21 is expressed as follows.

$$\phi_{Mp1} = \frac{\phi_{p1}}{1 + (T_p \cdot f)^2}$$

In this equation $T\rho$ is a time constant and f is the frequency. As mentioned, curve $\phi_{Mp1}$ represents a constant portion of the bulk material density fluctuations which are independent of frequency. The power density spectrum of a complete model of the stochastic disturbances is shown in the characteristic $\phi_M$. The sum of the individual power densities $\phi_{Mn}$, $\phi_{Mp1}$, and $\phi_{Mp2}$ corresponds to $\phi_M$ for $\Delta\phi_{p2}$ and $T_{92}=0$. Based on this functional relationship, the model generator section 7.2 calculates a model $\phi_M$ for small deviations which are supplied to the input 17a of the comparator circuit 17, the output of which is connected to a controller adjustment circuit 18 to receive a parameter set $\hat{P}_0$.

The noise parameter estimator fits the model $\phi_M$ to the spectrum $\phi_2$ as calculated from the measured data in the correction circuit to minimize the least square fitting error between the two spectra by variation of the parameter vector P.

The above mentioned estimation is performed by estimating in step 17.1 the parameter deviation $\Delta\hat{P}$ for an operating point with parameters $\hat{P}_0$, that influences the matrix M as shown in 7.3, using the known Least-Squares-Estimator. The estimator vector $\Delta\hat{P}$ is used to update $\hat{P}_0$ in step 17.2. $\hat{P}_0$ then serves as a new operating point in 7.1 in the next iteration. The estimation procedure is performed r times where in many applications r=5 is sufficient. At its output 17b the noise parameter estimator provides the vector of parameters $\hat{P}_0$ that, when used in the model $$\hat{\phi}_M=\phi_M(\hat{P}_0),$$

fits the calculated spectrum $\phi_2$ best. An example of the spectrum $\phi_2$ and its fit $\hat{\phi}_M$ comprising $\hat{\phi}_{Mp1}$, $\hat{\phi}_{Mp2}$ and $\hat{\phi}_{Mn}$ is shown in FIG. 3, please see FIG. 9.

The mathematical model also includes the structure of the model which is supplied by the model generator 7 to the closed loop controller adjustment circuit 18 through a conductor 7a. The circuit 18 also receives at another input the parameters $\hat{P}_0$ estimated in 17 by noise parameter estimator 17 through the conductor 17b.

Based on the estimated noise spectra $(\hat{\phi}_{Mp1}+\hat{\phi}_{Mp2})$ on the one hand and $\hat{\phi}_{Mn}$ on the other hand the optimal causal mean square estimator transfer function H, known as Wiener Filter in literature, for the estimation of the material density fluctuation signal having the spectrum $(\hat{\phi}_{Mp1}+\hat{\phi}_{Mp2})$ the observation noise signal having the spectrum $\hat{\phi}_{Mn}$ is calculated in step 18.1 according to Athanasios Papoulis, "Signal Analysis", McGraw-Hill Inc. 1977, pages 336 to 343. The circuit 18.2 then performs a further calculating step for ascertaining the optimal transfer function R of the closed loop controller 5 in accordance with the following equation:

$$R = \frac{H}{1 - H}.$$

Figure 10:
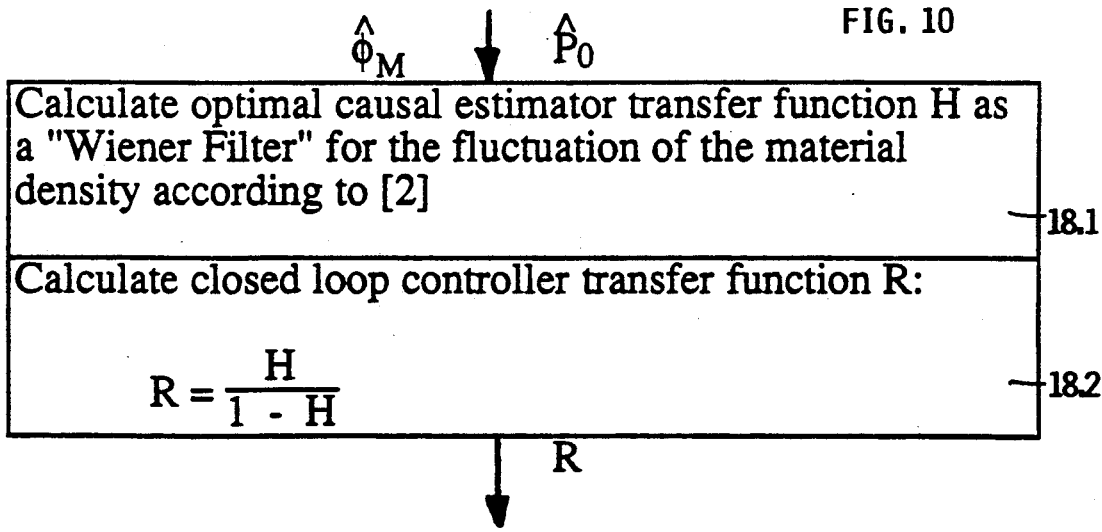
FIG. 10 illustrates the function of the closed loop controller adjustment circuit of FIG. 1.

The circuit 18, the function of which is illustrated in FIG. 10, then sets the closed loop controller transfer function in the closed loop controller 5 in that way that it equals the transfer function R as calculated in 18.2.

Such an adjustment operation is practically performed based on a scanning or sampling time interval $T_o$ of about 100 seconds. Such a cycle or duration is selected for practical reasons because the precision of the optimizing operation increases with the duration of the measured signal. Such an adjustment or correction operation is repeated after a pause of about 10 seconds. This pause of 10 seconds is an empirical value which depends much on the expected variations or fluctuations of the stochastic disturbances. Thus, it is quite possible that the correction or adjustment operation needs to be repeated at less frequent intervals, depending on the particular circumstances of the closed loop control system.

The present system has been described with reference to an example of a loss-in-weight feeder. However, the present teaching is applicable in other closed loop control systems including weighing systems not used in such a feeder. Generally, the present teaching is applicable in systems in which disturbances of the controlled process and the observation of a stochastic character and the disturbances of a monochromatic character occur.

| Table of mathematical Symbols | |
|---|---|
| $(.)^T$: | matrix of vector transpose |
| t: | time |
| k: | time index, $k = \ldots, -1, 0, 1, \ldots$ |
| i: | integer index |
| r: | number of iterations used during parameter estimation |
| $T_R$: | sampling rate of mass-flow estimator and closed loop controller |
| $T_E$: | sampling rate of evaluating circuit |
| $T_O$: | time interval of evaluating circuit used to adjust controller |
| N: | length of scanning interval in sampling steps |
| $\dot{m}(t)$: | physical mass flow out of the feeder to the following production process |
| $\dot{m}_k$: | $\dot{m}(t)$ sampled at instances $t = kT_R$ |
| $<\dot{m}_k>$: | set of last N values of $\dot{m}_k$ |

-continued

Table of mathematical Symbols

| Symbol | Description |
|---|---|
| $\hat{m}(t)$: | estimated value of mass flow at instances $t = kT_R$ |
| $w(t)$: | mass flow setpoint |
| $f$: | frequency |
| $f_a$: | centre frequency of monochromatic portions |
| $f_R$: | known frequency of rotating parts |
| $T_\rho$: | Time constant of material density fluctuation |
| $T_{\rho 0}$: | some fixed value of $T_\rho$ |
| $\Delta T_\rho$: | small deviation $T_\rho - T_{\rho 0}$ |
| $H$: | transfer function of closed control loop |
| $R$: | transfer function of controller |
| $P$: | parameter vector general |
| $P_0$: | some fixed value of $P$ |
| $\hat{P}_0$: | estimated absolute value of $P$ during iteration |
| $\Delta \hat{P}_0$: | small variation around $\hat{P}_0$ |
| $F(t)$: | measured weight signal |
| $F_k$: | $F(t)$ for $t = kT_R$ |
| $\phi_1(f)$: | power density spectrum of estimated mass flow |
| $\phi_2(f)$: | power density spectrum of strochastic noise only |
| $\phi_M$: | model power density spectrum of stochastic noise |
| $\phi_{ML}$: | model power density spectrum $\phi_M$ (linear in parameters P) |
| $\phi_{Mn}$: | model spectrum of observation noise |
| $\phi_{Mp1}$: | constant part of model spectrum of material density fluctuation |
| $\Delta\phi_{Mp2}$: | model $\phi_{Mp2}$ for small variations |
| $\phi_{Mp20}$: | model spectrum of observation noise at some fixed value |
| $D(f)$: | sensitivity of $\Delta\phi_{Mp2}$ to small $\Delta\phi_{p2}$ |
| $E(f)$: | influence of $\Delta\phi_{Mp2}$ to small $\Delta T_\rho$ |
| $\phi_{Mp2}$: | frequency dependent part of model spectrum of material density fluctuation |
| $\hat{\phi}_M$: | best fit of $\phi_M$ to $\phi_2(f)$ |
| $\hat{\phi}_{Mn}$: | best fit of $\phi_{Mn}$ to $\phi_2(f)$ |
| $\hat{\phi}_{Mp1}$: | best fit of $\phi_{Mp1}$ to $\phi_2(f)$ |
| $\hat{\phi}_{Mp2}$: | best fit of $\phi_{Mp2}$ to $\phi_2(f)$ |
| $\phi_n$: | magnitude of observation noise |
| $\phi_{p1}$: | magnitude of constant part of model spectrum of material density fluctuation |
| $\phi_{p2}$: | magnitude of frequency dependent part of model specturm of material density fluctuation |
| $\phi_{p20}$: | some fixed value of $\phi_{p2}$ |
| $\Delta\phi_{p2}$: | small deviation $\phi_{p2} - \phi_{p20}$ |
| $\hat{\phi}_n$: | parameter $\phi_n$ of best fit $\hat{\phi}_{Mn}$ |
| $\hat{\phi}_{p1}$: | parameter $\phi_{p1}$ of best fit $\hat{\phi}_{Mp1}$ |
| $\hat{\phi}_{p2}$: | parameter $\phi_{p2}$ of best fit $\hat{\phi}_{Mp2}$ |
| $\sigma_n^2$: | variance of observation noise in U.S. Pat. application 879,430, filed June 27, 1986 |

Although the invention has been described with reference to specific example embodiments it will be appreciated that it is intended to cover all modifications and equivalents within the scope of the appended claims.

What I claim is:

1. A method for improving the control precision of a closed loop controlled system including a controlled operating section and a controlling section, comprising the following steps:

(a) sampling by a sensor an actual operational value of said controlled operating section and estimating another actual value from said sampled actual value;

(b) providing a set point signal and producing a closed loop control signal from said estimated actual operation signal and from said set point signal for controlling said closed loop controlled system, (c) establishing mathematic models of at least two stochastic disturbance model spectra of said closed loop control system, (d) producing control modifying signals for influencing said controlling section, said producing step comprising, (e) forming, for a fixed length of time, from said actual operational value an estimated actual operation signal, (f) forming from said estimated actual operation signal a power density spectrum, (g) determining from said power density spectrum a stochastic disturbance spectrum based on first proportions of stochastic disturbances by disregarding second proportions of monochromatic disturbances, (h) comparing said stochastic disturbance spectrum with said stochastic disturbance model spectra and selecting that model spectrum which fits said stochastic disturbance spectrum most closely, (i) dividing said selected model spectrum into first parts corresponding to disturbances of said sensor and into second parts corresponding to variations of the controlled actual value, and (j) using said first and second parts of said selected model spectrum as said control modification for said influencing of said controlling section to increase the accuracy of said closed loop controlled system.

2. The method of claim 1, wherein said controlled operating section comprises a loss-in-weight feeder, said method further comprising forming said estimated actual operational value as a value representing a mass-flow of bulk material through said feeder.

3. The method of claim 2, wherein said variations in said estimated actual operational value represent bulk material density variations.

4. The method of claim 1, wherein said controlled operating section comprises a weighing scale, said method further comprising forming said actual operational value as a weight representing value.

5. The method of claim 1, wherein said step (g) of determining from said power density spectrum a stochastic disturbance spectrum comprises:

(a) establishing an upper limit for a power density, and (b) comparing said power density with said upper limit to determine said stochastic disturbance spectrum as one disturbance spectrum not having any zones above said limit value, and wherein said step (h) of comparing is performed by using only said one disturbance spectrum not having any zones above said limit value.

6. The method of claim 1, further comprising performing said comparing step by applying a least square errors parameter estimation to said stochastic disturbance spectrum and to said selected model spectrum for finding an optimal approximation between said selected model spectrum and a power density spectrum of the estimated actual value.

7. An apparatus for improving the control precision of a closed loop control system, comprising a controlled operating section, a controller section (5) and signal evaluating circuit means (14) for minimizing at least two stochastic precision disturbing values by way of a model calculation, said signal evaluating circuit means (14) comprising a spectral analyzing circuit (15) for scanning or sampling, for a fixed length of time, an estimated signal representing the actual operational value of said controlled operating section to form a first power density spectrum, a spectrum identifying circuit (6) operatively connected to an output of said signal analyzing circuit for identifying frequencies where said first power density spectrum exceeds a fixed threshold power density value, a correction circuit (16) connected to said output of said spectral analyzing circuit (15) and to an output of said spectrum identifying circuit (6) for forming a second power density spectrum of stochastic disturbances ($\phi_2$), a noise parameter estimating circuit (17) connected to an output of said correction circuit (16), a model generator (7) connected with an output to said noise parameter estimating circuit (17) for providing model spectra to said noise parameter estimating circuit (17) for selecting an approximation model spectrum which most closely approximates said second power density spectrum of stochastic disturbances, a closed loop controller adjustment circuit (18) having one input connected to said noise parameter estimating circuit (17) and a further input connected to an output of said model generator (7) for selecting from said approximation model spectrum a spectrum representing one of said two stochastic precision disturbing values and for selecting from model spectra supplied by said model computer the other of said two stochastic precision disturbing values, and a connector circuit (8) connecting an output of said controller adjustment circuit (18) to said closed loop controller section (5) for adjusting said closed loop controller section (5) to an optimal control of said controlled operating section.

8. The apparatus of claim 7, wherein said controlled operating section is a dosing scale for bulk material, wherein said closed loop controlled section comprises a sensor for sampling an actual weight, which is subject to observation noise forming one of said at least two precision disturbing signals, and a mass-flow estimator circuit (12) for estimating the actual mass-flow, and wherein said mass-flow is subject to disturbances caused by fluctuations of the bulk material density forming the other of said at least two precision disturbing signals.

* * * * *